United States Patent
Graehling et al.

(10) Patent No.: US 12,511,891 B2
(45) Date of Patent: Dec. 30, 2025

(54) UNIFIED AI MODEL TRAINING PLATFORM

(71) Applicant: ZeroEyes, Inc., Conshohocken, PA (US)

(72) Inventors: Quinn Graehling, Columbus, OH (US); Timothy Sulzer, Jenkintown, PA (US); Marcus Day, Jenkintown, PA (US); Samuel Mohebban, Washington, DC (US)

(73) Assignee: ZeroEyes, Inc., Conshohocken, PA (US)

( * ) Notice: Subject to any disclaimer, the term of this patent is extended or adjusted under 35 U.S.C. 154(b) by 379 days.

(21) Appl. No.: 18/210,266

(22) Filed: Jun. 15, 2023

(65) Prior Publication Data

US 2023/0410494 A1   Dec. 21, 2023

Related U.S. Application Data

(60) Provisional application No. 63/352,273, filed on Jun. 15, 2022.

(51) Int. Cl.
*G06V 10/00* (2022.01)
*G06V 10/778* (2022.01)
*G06V 10/82* (2022.01)

(52) U.S. Cl.
CPC ............ *G06V 10/82* (2022.01); *G06V 10/778* (2022.01)

(58) Field of Classification Search
CPC ............ G06N 3/02; G06N 3/08; G06N 3/042; G06N 3/045; G06N 3/047; G06N 3/082; G06N 3/088; G06N 3/092; G06N 3/0454; G06N 3/0475; G06N 3/0464; G06N 20/00; G06N 20/10; G06N 20/20; G06V 10/80; G06V 10/82; G06V 10/761; G06V 10/762; G06V 10/778; G06V 10/774; G06V 10/776

See application file for complete search history.

(56) References Cited

U.S. PATENT DOCUMENTS 11,049,239 B2 * 6/2021 Soni ..................... G06V 10/772
11,120,364 B1 9/2021 Gokalp et al.
(Continued)

OTHER PUBLICATIONS

International Search Report and Written Opinion dated Sep. 14, 2023, of counterpart International Application No. PCT/US2023/025398.
(Continued)

*Primary Examiner* — Amir Alavi
(74) *Attorney, Agent, or Firm* — DLA Piper LLP (US)

(57) ABSTRACT

Systems, methods, apparatuses and non-transitory computer executable media configured to unify preprocessing, configuration, training, monitoring, and evaluation of multiple neural network based object detection algorithms under a singular development environment/platform (i.e., a "unified training platform"). The unified training platform may include a neural network agnostic model training environment that addresses the deficiencies described above and may allow for unified data annotation formatting. In addition to incorporating a wide variety of state-of-the-art neural networks into the unified training platform, the unified training platform may also provide full accessibility to available network optimizations. The present disclosure may also include a universal model converter.

20 Claims, 8 Drawing Sheets

(56) References Cited

U.S. PATENT DOCUMENTS

| | | | |
|---|---|---|---|
| 11,301,733 B2* | 4/2022 | Shlens | G06T 11/001 |
| 11,308,335 B2 | 4/2022 | Sulzer et al. | |
| 11,334,766 B2* | 5/2022 | Li | G06V 10/25 |
| 11,379,710 B2* | 7/2022 | Wang | G06N 3/08 |
| 11,501,161 B2* | 11/2022 | Venkatraman | G06Q 10/067 |
| 11,899,749 B2* | 2/2024 | Radhakrishnan | G06V 10/242 |
| 11,948,347 B2* | 4/2024 | Qu | G06F 18/22 |
| 12,094,181 B2* | 9/2024 | Ranganathan | G06V 10/255 |
| 12,131,536 B2* | 10/2024 | Moloney | G06N 3/08 |
| 12,260,616 B1* | 3/2025 | Rajan | G06V 10/82 |
| 2019/0362195 A1 | 11/2019 | Cao et al. | |
| 2020/0125956 A1 | 4/2020 | Ravi et al. | |
| 2020/0160177 A1 | 5/2020 | Durand et al. | |
| 2020/0302161 A1 | 9/2020 | Sriram et al. | |
| 2021/0117415 A1 | 4/2021 | Sriharsha | |
| 2021/0374502 A1 | 12/2021 | Roth et al. | |
| 2023/0410494 A1* | 12/2023 | Graehling | G06V 10/778 |
| 2025/0173359 A1* | 5/2025 | Edwards | G06F 16/285 |

OTHER PUBLICATIONS

International Preliminary Report on Patentability of the International Searching Authority and Written Opinion mailed Dec. 26, 2024, of counterpart International Application No. PCT/US2023/025398.

* cited by examiner

UNIFIED AI MODEL TRAINING PLATFORM

CROSS-REFERENCE TO RELATED APPLICATIONS

This application claims benefit to U.S. Provisional Patent Application No. 63/352,273 entitled "Unified AI Model Training Platform," which was filed on Jun. 15, 2022. The entirety of this application is hereby incorporated herein by reference.

TECHNICAL FIELD

The present disclosure is generally directed to the training of artificial intelligence ("AI") and machine learning ("ML") models and more specifically, to systems and methods for unifying the preprocessing, configuration, training, monitoring, and evaluation of multiple neural network based object detection algorithms under a singular development environment.

BACKGROUND

Conventional systems and methods for ML operations and AI model training are typically: a) closed source, which limits the ability to perform custom integrations and optimizations; b) limited to specific data annotation conventions and input file formats; c) restrictive in terms of their ability to configure and optimize trained networks; and d) compatible with only a small proportion of available model/engine output formats and third-party plugins.

SUMMARY

Additional features and advantages of the disclosure will be set forth in the detailed description, claims, and drawings, and in part will be readily apparent to those skilled in the art. It is to be understood that both the foregoing general description and the following detailed description present various examples of the disclosure, and are intended to provide an overview or framework for understanding the nature and character of the claims. The accompanying drawings are included to provide a further understanding of the disclosure, and are incorporated into and constitute a part of this specification. The drawings illustrate various examples of the disclosure and together with the description serve to explain the principles and operations of the disclosure.

The present disclosure is directed to systems, methods, apparatuses and non-transitory computer executable media configured to unify preprocessing, configuration, training, monitoring, and evaluation of multiple neural network based object detection algorithms under a singular development environment/platform (i.e., a "unified training platform"). The unified training platform may include a neural network agnostic model training environment that addresses the deficiencies described above and may allow for unified data annotation formatting. In addition to incorporating a wide variety of state-of-the-art neural networks into the unified training platform, the unified training platform may also provide full accessibility to available network optimizations. The present disclosure may also include a universal model converter.

The unified training platform may retrieve a dataset from one or more databases based on a configuration file, the dataset comprising image files extracted from one or more video feeds along with corresponding label files comprising information about one or more annotations added to the image files. It may be determined that one or more of the image files and one or more of the label files are in a format that is not compatible with a required format of neural network architecture specified in the configuration file. The one or more of the image files and the one or more of the label files may be reformatted such that the dataset is formatted for the neural network architecture. A neural network architecture may be selected from a repository based on the configuration file. A machine learning (ML) model may be trained based on the formatted dataset and one or more hyperparameters. A performance of the ML model may be evaluated over one or more object detection metrics. The one or more hyperparameters may be adjusted and the training may be iterated until the performance of the ML model meets a determined threshold. Once the performance of the ML model meets the determined threshold, the ML model may be converted to a file format that is compatible with a production platform.

BRIEF DESCRIPTION OF DRAWINGS

Other objects and advantages of the present disclosure will become apparent to those skilled in the art upon reading the following detailed description of exemplary embodiments and appended claims, in conjunction with the accompanying drawings, in which like reference numerals have been used to designate like elements, and in which:

The figures are for purposes of illustrating example embodiments, but it is understood that the inventions are not limited to the arrangements and instrumentality shown in the drawings. In the figures, identical reference numbers identify at least generally similar elements.

DETAILED DESCRIPTION

Figure 1:
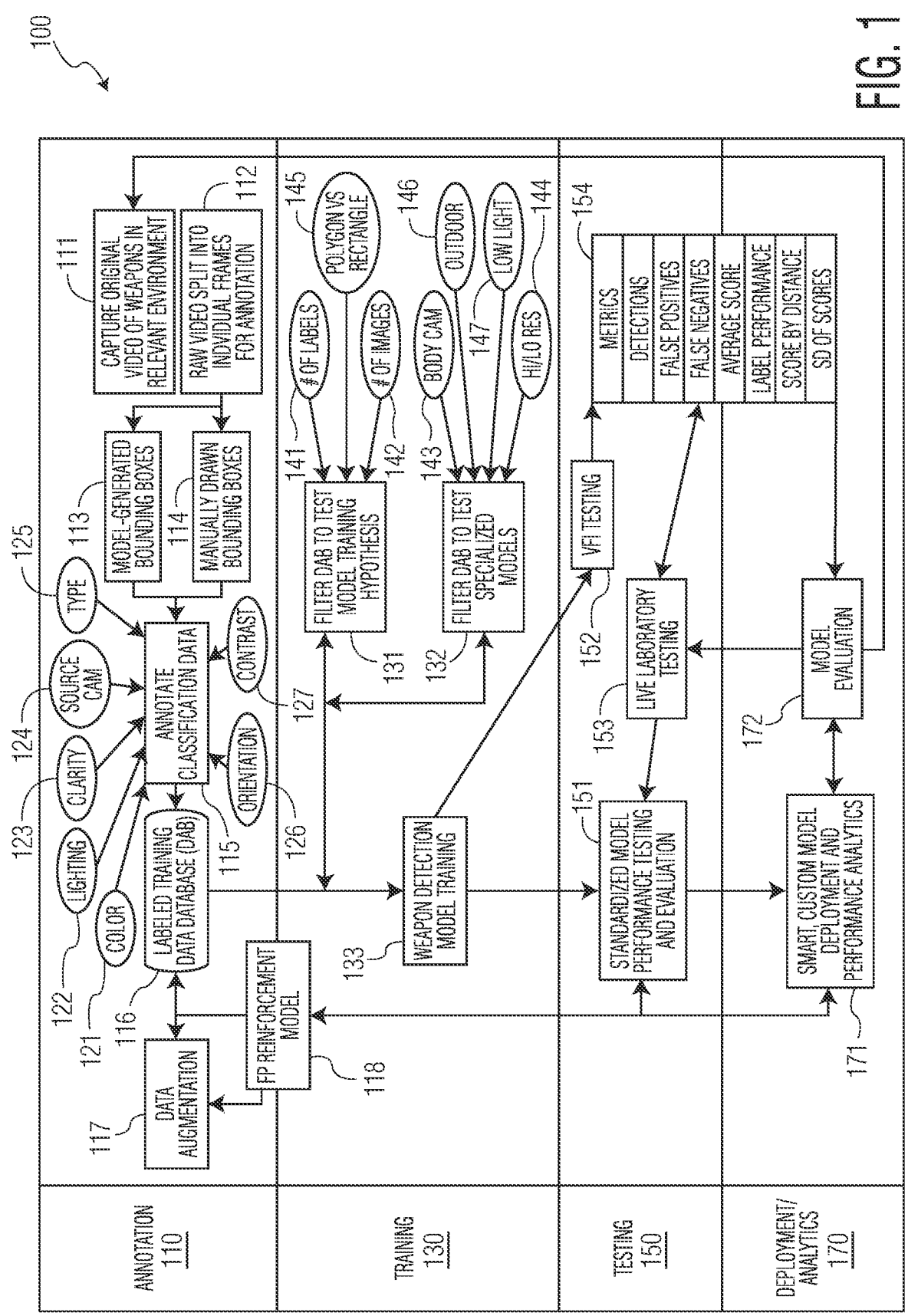
FIG. 1 is a functional diagram of an intelligent video surveillance (IVS) system, according to an example of the present disclosure.

The following description of the present subject matter is provided as an enabling teaching of the present subject matter and its best, currently-known examples. Those skilled in the art will recognize that many changes can be made to the examples described herein while still obtaining the beneficial results of the present subject matter. It will also be apparent that for some examples, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of examples of the present subject matter may be directed towards or reference specific systems and/or methods, it is to be understood that the discussion is not intended to limit the scope of the present subject matter in any way and that the principles presented are equally applicable to other systems and/or methods.

Those skilled in the art will further appreciate that many modifications to the examples described herein are possible without departing from the spirit and scope of the present subject matter. Thus, the description is not intended and should not be construed to be limited to the examples given but should be granted the full breadth of protection afforded by the appended claims and equivalents thereto.

The present disclosure describes systems, methods, apparatuses and non-transitory computer executable media configured to unify preprocessing, configuration, training, monitoring, and evaluation of multiple neural network based object detection algorithms under a singular development environment/platform (i.e., a "unified training platform"). The unified training platform may include a neural network agnostic model training environment that addresses the deficiencies described above and may allow for unified data annotation formatting. In addition to incorporating a wide variety of state-of-the-art neural networks into the unified training platform, the unified training platform may also provide full accessibility to available network optimizations. As described below, the present disclosure may also include a universal model converter.

The unified training platform may produce models that are superior to those trained in existing training platforms and may improve upon existing products in the following areas: data conversion speed, training time, model optimization, insights into training data curation/selection, hardware compatibility and performance metrics, dynamic data augmentation, and training groups of models sequentially in a way that the results of the initial model training inform the parameters for the sequential model training. The unified training platform may operate in conjunction with, and/or be incorporated into an intelligent video surveillance (IVS) system.

Referring now to FIG. 1, a functional diagram of an IVS system 100 is shown. The IVS system 100 may perform real-time analytics on a live video stream, and may include at least one video surveillance system module having, for example: a video surveillance camera; a video encoder (e.g., a hardware encoder and/or a software encoder) to encode video gathered by the video surveillance camera; and a video analysis engine coupled to the video surveillance camera to analyze the live video stream gathered by the video surveillance camera and to create data derived from the video. The video analysis engine of the IVS system 100 may include one or deep learning models stored in one or more repositories and one or more databases (hereinafter "DAB") 116 configured to store data associated with recorded testing videos. The DAB 116 may be responsible for storing/retrieving all data generated for the purpose of model training and development and for formatting data into specific requested datasets based on the performance needs of a particular model.

In an example, the DAB 116 may be a specifically configured database and/or a software specifically configured to store and retrieve data in these databases. The datasets therein may be used to train the ML models. In addition, the DAB 116 may be a non-ML based service that captures meta data using one or more algorithms. As used herein, the DAB 116 may be a representation of a database that can contain multiple databases (e.g., hierarchal) that may be relied on by many different services. The DAB 116 may receive, process, and store generic, readily available data that may be harvested from online sources. In the case of computer vision models, there are several open-source datasets (i.e., ImageNet and Google's Open Image Dataset) that may be used. However, these open-source datasets may feature mediocre quality images that are not typical of realistic situations where actual particular objects need to be detected.

The available image data suitable for training the disclosed weapon detection deep learning models utilized by the IVS system 100 may be very limited and therefore not useful for actual detection situations. The majority of data available online often displays up-close, profile views of weapons, which may not be representative of the view of weapons in typical surveillance video. In the unique case of processing video almost exclusively from surveillance cameras, the data collection process may be further complicated due to the specific distances and camera angles that need to be represented in the dataset to enable the dataset to be used to train high-performing models. Low quality image inputs generally lead to low performing deep learning models. Accordingly, other sources of image data may be used to populate data in the DAB 116 and to train models capable of high accuracy in real-world environments.

In certain examples, the DAB 116 may receive data from one or more other sources. In an example, custom surveillance video footage may be recorded featuring actual weaponry (e.g., using a green screen to simulate actual environments). In another example, high-quality game development engines such as Unreal Engine (the engine used to create Fortnite and many other modern, highly-detailed graphic games) may be used to create photo-realistic scene replications of actual camera views from potential customers' surveillance cameras.

In various examples, hundreds of hours of surveillance footage (videos and/or still pictures) may be recorded, focusing on capturing as many different scenarios as possible. This surveillance footage may be used for training and testing, selecting, and/or improving various deep learning models as discussed below. Variables that may be taken into account while recording training data include, but are not limited to: time of day (dawn/dusk/night, shade/overcast/full sun, etc.), type of weapon used (a wide range of different pistols and rifles were recorded), and the position of the weapon (e.g., movement speed, distance, orientation, weapon visibility, etc.) Additionally, the following exemplary, non-exhaustive, list of factors for the surveillance footage that affect object detection were analyzed and/or tested.

TABLE 1

Factors for Surveillance Footage

| Category | Factor |
| --- | --- |
| Environmental Factors | Time of day relating to light levels and potential for shadows (steep sun angles at dawn/dusk)<br>Weather conditions (fog, rain, snow, overcast, full sun) |

TABLE 1-continued

Factors for Surveillance Footage

| Category | Factor |
|---|---|
| Camera and Hardware Factors | Camera filters and lighting settings (day vs night for infrared-iris, contrast, color vs black and white, etc.)<br>Resolution (should represent a range of current standards, 1440 p, 1080 p, 720 p, 480 p, etc.)<br>Frame rate (only matters if testing on video)<br>Detection frame rate (only matters if testing on video)<br>Lens type (wide angle, fisheye, standard)<br>Noise (dust/condensation/glare on lens)<br>Height and angle of camera (affects the visible orientation of the gun-average security camera at 10-12 ft) |
| Gun Factors | Size of gun (pixel area can be used as an approximation of distance from camera-would be good to define standards for weapon sizes at various distances<br>Visibility (full, partially concealed, fully concealed, holstered, partially off camera)<br>Material concealing the weapon (thickness/material of clothing/container that may be partially or fully obscuring view-important for solutions that attempt to detect fully concealed weapons)<br>Orientation (vertical pointed up/down, angle up/down, profile view, top down view etc.)<br>Color (metallic, black, blue, other color/materials)<br>Contrast to clothing/background (in conjunction with other factors, i.e.-black weapon on black shirt in full sun)<br>Specific gun models and/or categories: for long guns, assault rifle, semi-automatic rifle, AR-15 style rifle, AK-47 rifle, hunting rifle, long-range rifle, bullpup-style, shotgun, etc.; and for pistols-revolver, semi-auto, 3D-printed, etc. |
| Human Factors | Complexion (e.g., hand color)<br>Object contrast to background<br>Hand contrast to object<br>Hand contrast to background<br>Clothing color<br>Bag color<br>Cell phone color |

Once recorded, the surveillance footage may be exported either with lossy or lossless compression using formats such as, but not limited to, MJPG, H264, H265, PNG, JPG etc. The exported footage may be split into frames using, in a non-limiting example, the command line utility, FFmpeg. The individual frames may be reviewed for further processing. Processing too many frames may lead to datasets of unmanageable size and may cause overfitting/overtraining of a model due to training the model with large quantities of highly similar images. In various examples, the number of frames chosen for 1 second of video may be less than 5, between 2-5 (inclusive), between 1-4 (inclusive), between 1-3 (inclusive), between 1-2 (inclusive), and all subranges therebetween. In an example, the frames that may be chosen are those that include the highest "quality" images based on one or more of the following factors: (1) visibility of the item of interest, (2) clarity of the image in the frame, (3) clarity of the item of interest, (4) orientation of the item of interest, (5) viewing angle of the camera taking the image, and combinations thereof. The frames may be chosen manually, or they may be chosen using one or more unsupervised means (e.g., using hashing and one or more ML models).

The chosen video frames may then be processed to include one or more of point samples, poly lines, bounding boxes, and/or bounding polygons and labels. Point samples may be a single point that represent the x and y coordinate of where the point is in a space. Poly lines may be similar to polygons, but they are not closed (i.e., they may be single lines drawn on the image which can contain a list of x,y coordinates). In an example, a bounding box may be rectangular in shape. In other examples, a bounding box may be polygonal in shape. Bounding boxes may be added to the chosen frames where the bounding boxes typically surround (fully or substantially completely) an object of interest, such as a rifle, pistol, or other weapon. Bounding polygons (such as a polygon that generally traces the outline of an object of interest) may be added to the chosen frames either instead of, or in addition to, a bounding box. Additionally, the chosen frames may be annotated with a unique set of weapon labels and/or attributes which may separate out labeled objects into subcategories and allow the deep learning models to identify similar weapons with different characteristics that reflect how those weapons are represented and later identified. As a non-limiting example, a handgun may be assigned the label "pistol" and may have a variety of attributes assigned to that label such as, but not limited to, color, the presence or absence of aiming sights, length, in or out of a holster, orientation, how the pistol is being held/pointed, etc. Polygons and bounding boxes may be used by the AI model, while poly lines and point samples may be used to collect metadata.

The IVS system 100 may train, detect, and/or identify an object of interest using one or more models according to examples of the present disclosure described herein. An Annotation Phase 110 of the IVS system 100 may include capturing original videos, either in an artificial environment and/or in relevant environments as discussed herein; annotating objects and attributes; applying automated bounding boxes/polygons to objects of interest; and then augmenting the data. A Training Phase 130 of the IVS system 100 may include filtering the database from the annotation phase where the filtering may be based on attributes, cameras, environments, etc., as discussed herein; and model training using bounding polygons and/or bounding boxes. A Testing Phase 150 of the IVS system 100 may use video file inference testing, as described herein, and/or live testing to determine model performance. A Deployment/Analytics Phase 170 of the IVS system 100 may include model evaluation and may incorporate a feedback loop between model performance and database composition.

The Annotation Phase 110 of the IVS system 100 may include one or more annotation processes. At block 111 original video may be captured in a relevant environment for the particular setting/location for which the model will be employed. This may be accomplished by a person carrying an object of interest, such as a weapon, appearing and/or passing through a field of view of a still or video camera. This may entail a person carrying a weapon in front of a camera at a client's site using video surveillance cameras already in place at the client site. At block 112, the original video, or portions thereof, may be split into individual frames for annotation. This may be done manually or it may be guided by a ML model that decides whether a frame should be included. At block 113, model-generated bounding boxes and/or bounding polygons may be added to some or all of the frames from block 112. At block 114, manually-generated bounding boxes and/or bounding polygons may be added to some or all of the frames from block 112. Both bounding boxes and bounding polygons may be added to some or all of the frames. At block 115, one or more of the frames may be annotated/labeled with classification data, as discussed herein. Some or all of the annotations may be automatically generated by the model, manually added by an operator, or both. The models may be run using different combinations/permutations of classification data. The classification data may include one or more of: at block 121, color (e.g., color of weapon, interloper's clothes, general environment, etc.); at block 122, lighting (e.g., day, night, overcast, ambient light, artificial light, combinations of lighting sources, etc.) levels may be categorized as low, medium, or high. In an example, a numerical representation of brightness may be generated based off an amplitude of individual pixels. At block 123, clarity (e.g., focus, resolution, level of pixelization, blurriness, etc.); at block 124, source camera information (e.g., location, height above ground, distance from and or size of an interloper with object of interest (either or both of which may be determined based, at least in part, on one or more of the camera resolution, the camera field of view, and mounted height of the camera, or may be determined in relation to an object in the field of view with the interloper), GPS coordinates, manufacturer, model (which may be used to determine camera resolution), frame rate, color/black and white, f-stop, saturation level, etc.); at block 125, type of object of interest (e.g., pistol, rifle, or other type of weapon); at block 126, orientation of the object of interest (e.g., how held, rotational orientation (which may be determined, for example, using a protractor), extended from body, holstered, covered, etc.). This may be automated through the use of poly lines, etc. described above. At block 127, contrast (e.g., color difference between object of interest and environment (e.g., clothing of interloper, background, other persons in the area, etc.); the RGB (or similar) levels of the object of interest may be compared with the RGB (or similar) levels of an area surrounding the object of interest, a bounding box/polygon may be expanded to include the object of interest as well as part of the immediate background in the image relative to the object of interest).

The frames, some or all of which may include bounding boxes, bounding polygons, and/or annotations, may be entered into the DAB 116. The DAB 116 may be searchable by the associated metadata (e.g., bounding boxes, bounding polygons, annotations/labels, etc.) At block 117, data augmentation may be used to refine the metadata. As a non-limiting example, a bounding box and/or bounding polygon may be adjusted to better fit the object of interest. Examples of these adjustments include translating, rotating, expanding, contracting the one or more sides of the bounding box or bounding polygon. A centroid of the bounding box/polygon (which may be one or more pixels) may be determined. The centroid may be determined based on, e.g., the intersection points of two or more sides of the bounding box/polygon, the maximum and minimum x-coordinates of the bounding box/polygon, the maximum and minimum y-coordinates of the bounding box/polygon, or combinations thereof. The maximum and minimum coordinate values may be determined by the row and/or column number of pixels in the underlying frame/image using a predetermined location of the frame/image as the origin of the coordinate system. Other data that may be modified to further augment training data includes, but may not be limited to, contrast, color levels, brightness, saturation, and hue.

At block 118, a false positive reinforcement model may supply data to adjust the data augmentation feature described above. As a non-limiting example, false positives may be saved periodically, or from time-to-time, and may be incorporated, in whole or in part, into the iterative training process. The false positive reinforcement model may also supply data to be entered into the database including typical model outputs including, but not limited to, confidence score, event duration, pixel area size, object speed, minimum range of object movement, average object size, and average pixel speed. This data may be used to seed the annotation process with pre-existing data.

The Training Phase 130 of the IVS system 100 may include one or more training processes, as described herein throughout the present disclosure. At block 131, information from the DAB 116 may be used in whole or may be filtered for testing a model training hypothesis. Non-limiting examples of filtering include use of a particular type of label, group of labels, and/or number of labels (block 141); use of a particular image, group of images, and/or number of images (block 142); use of a bounding box and/or bounding polygon (either augmented or not) (block 145); and combinations thereof. Additionally or alternatively, the classification data in blocks 121-127 may be used for filtering.

Additionally and/or alternatively, at block 132, information from the DAB 116 may be used in whole or may be filtered for training specialized models. Non-limiting examples of filtering include use of a bodycam or a camera in an elevator (block 143); use of a high or low resolution camera (block 144); use in an outdoor environment (block 146); use in low light conditions, which may include infrared and/or thermal imaging (block 147); and combinations thereof. Additionally or alternatively, the classification data in blocks 121-127 may be used for filtering.

At block 133, weapon detection model training, as described herein, takes place using input from one or more of the DAB 116, the model training hypothesis at block 131, and/or the specialized model training at block 132.

The Testing Phase 150 of the IVS system 100 may include one or more testing processes, as described herein throughout the present disclosure. At block 151, the output of the weapon detection model training at block 133 may be input into a standardized model performance testing and evaluation process. This process may also receive input from the FP reinforcement model 118. A predetermined annotated testing video may be employed to test and judge a model's performance, including detections, false positives, true positives, and for measuring the accuracy of the location, orientation, size, etc. of bounding boxes/polygons. The standardized model performance testing and evaluation process at block 151 may use as input one or more of video file inference testing (block 152) or live testing (block 153). Live testing may include input from model evaluation (block 172). The testing may include the computation and/or compilation of a number of metrics (block 154), such as, e.g., detections (hits/true positives), false positives, false negatives, average score, label performance, score by distance, standard deviation of scores; and combinations thereof The Deployment/Analytics Phase 170 of the IVS system 100 may include deployment/analytics processes, as described herein throughout the present disclosure. At block 171, the output of the standardized model performance testing and evaluation (block 151) may be input into the smart, custom model deployment and performance analytics process. Additionally, the process at block 171 may receive input from the FP performance model (block 118) and/or from the model evaluation process (block 172). Model evaluation (block 172 may receive input from metrics (block 154) and may provide feedback to the video capture at block 111.

The model evaluation process in block 172 may include an intelligent model deployment ("IMD"). The 1 MB may allow intelligent video surveillance systems to autonomously deploy optimal models for a given environment based on both inputs from the site and sensor, as well as data from a model testing scorecard. The IMD may enable the deployment of the best performing model for any video camera sensor at any given time based on observable, definable sensor variables and site conditions. Instead of relying on informed, but ultimately subjective, human decisions about model deployment, the 1 MB may determine the best model using an algorithm that selects a model from a database of deployable models based on performance metrics relevant to the environment defined by the aforementioned variables and conditions. Feedback may be provided to the video capture at block 111, and the process may iterate and updated modeling may be used to capture and store additional data in the DAB 116.

In an example, the IVS System 100 may be able to analyze and/or detect differing environmental conditions/characteristics in real-time surveillance video. This may be accomplished, in an example, by a dedicated environmental sensor that may be operatively coupled to the microprocessor. Upon receipt of the signal, which may be representative of an analyzed and/or detected environmental condition/characteristic, the microprocessor may dynamically select a situation-specific model (such as a neural network model or pre/post processing method) from an existing set of models and/or algorithms to perform the inference and/or identification and/or detection function on the real-time surveillance video.

FIGS. 2-5B are functional diagrams of a unified training platform 500, which may include Data Preparation 200, Machine Learning 300, and Model Deployment 400 portions. As described above, the unified training platform 500 may operate in conjunction with, and/or be incorporated into an intelligent video surveillance (IVS) system 100. The unified training platform 500 may be in constant communication with the DAB 116 to help execute several processes shared between these two pipelines. To that end, a portion of the unified training platform 500 may be dedicated to communicating with the DAB 116 and determining various statistics. These may be related to new DAB 116 generation, creation of particular DABs 116 to meet the needs of a model type, alerts for DAB 116 completions, and new data generations. Other communications may include alerts related to model evaluation data changes or changes to validation sets that need to be addressed by the unified training platform 500 to ensure models stay up to date.

Figure 2:
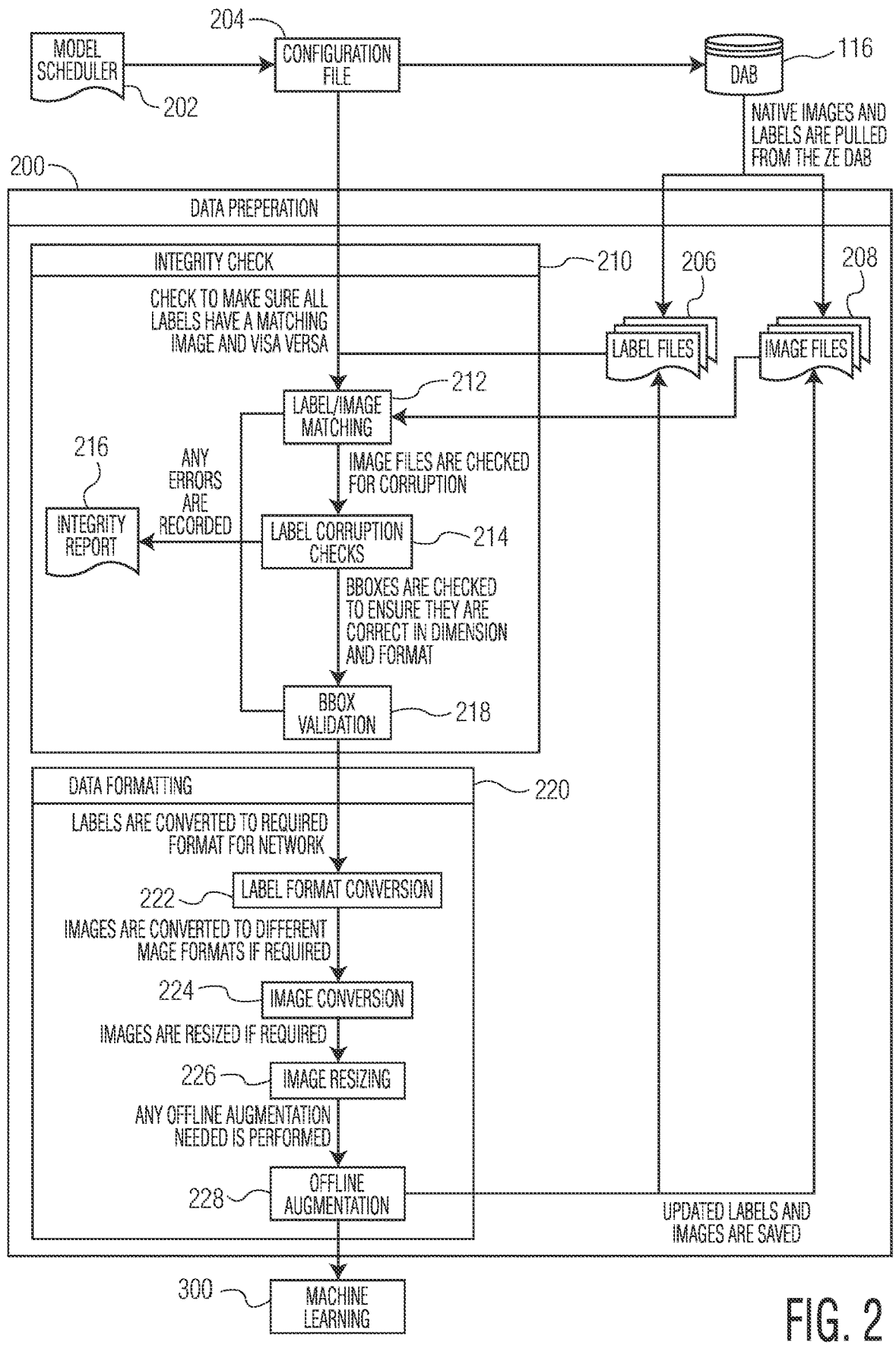
FIG. 2 is a functional diagram of a Data Preparation portion of a unified training platform, according to an example of the present disclosure.

Referring now to FIG. 2, a functional diagram of the Data Preparation 200 portion of the unified training platform 500 is shown. The Data Preparation 200 portion may serve as a conduit between the DAB 116 and the model training/evaluation processes contained within the Machine Learning 300 portion. Due to the dynamic nature of the unified training platform 500 and the multiple network architectures of the one or more ML models within one or more repositories of the IVS System 100, data generated by the DAB 116 may often need some level of integrity checking and data reformatting prior to being ingested to a specific network type. Model training may also be triggered when new data becomes available to the unified training platform 500. Therefore, the Data Preparation 200 portion may be capable of communicating with the DAB 116 and determining when a sufficient amount of novel data is present in order to trigger a new model training process. Various processes of the Data Preparation 200 portion are summarized below.

In an example, a model scheduler 202 may keep track of all submitted model training experiment requests and several experiment attributes such as purpose, data, network type, priority. The model scheduler 202 may receive manual requests from a user (e.g., via Slack or Google Forms) or it may receive automatic data-driven requests (e.g., when certain threshold of new data is stored in the DAB).

A configuration file 204 (i.e., a config.json) may be created. The configuration file 204 may be used to retrieve data from the DAB 116 and may be used as an input for the Data Preparation 200 process. The configuration file 204 may be generated automatically by the model scheduler 202 or may be manually created by a user. In an example, the configuration file 204 may match the needs of a model that is currently at the front of a queue the within model scheduler 202.

Once the configuration file 204 has been created, the Data Preparation 200 portion may begin. The process may be manually controlled (e.g., a user may point the unified training platform 500 to the configuration file 204 and the unified training platform 500 will handle the rest) or it may be performed automatically (e.g., if the request is data driven, it will not be required for user to execute, as this will be assumed). The unified training platform 500 may check for open resources and possible conflicts with the execution, and if there are none, the process may begin.

In the Data Preparation 200 phase, the dataset being used by the unified training platform 500 will be analyzed and formatted correctly according to the configuration file 204. The dataset will be checked for missing/duplicated files, corrupted data, and any other issues that may cause the experiment to fail. Any conversions or augmentations that may be required and were not handled upon creation by the DAB 116 may also be addressed and fixed. Label files may also be formatted to fit a labeling convention required by the neural network architecture being used in a Machine Learning 300 portion described below.

More specifically, label files 206 and image files 208 may be retrieved from the DAB 116 according to the configuration file 204. An integrity check 210 may be performed on the label files 206 and the image files 208 in accordance with configuration file 204. With the large and dynamic nature of the images stored in the DAB 116, there may often be issues when creating large datasets specifically related to the integrity of data created. This may refer to corrupted image/video/label files, missing image/label pairs, or duplications. Many of the neural networks that are integrated into the IVS system 100 may not be able to handle these types of data integrity issues and may simply kill any processes if problems are encountered relating to data integrity. Therefore, it may be beneficial to check the integrity of any data being used in the unified training platform 500 prior to its usage, both to ensure tasks will run smoothly from end to end and to alert the user of any particular issues within the data. Many of these processes may be handled by the DAB 116 itself and may not need addressing. However, it may be beneficial to have a failsafe in place to ensure smooth operational execution. The integrity check 210 may analyze new data created/presented and report back any issues present within the data that may interfere with proper running. These issues may include but are not limited to: file corruption, missing files, improper formatting, incorrect label/bounding box assignment, etc.

The integrity check 210 may include label/image matching 212, wherein it is confirmed whether all labels in the labels files 206 have a matching image in the images files 208. An image corruption check 214 may be performed to check for any corruption of the labels files 206 and the images files 208. Errors and or corruption may be logged in an integrity report 216. A boundary box validation 218 may be performed to ensure boundary boxes added to the images files 208 in the Annotation Phase 110 are correct in dimension and format.

The Data Preparation 200 portion of the unified training platform 500 may include a data formatting process 220. Due to the open source nature of most neural network architectures and codes, there is a vast amount of different labeling formats utilized in the fields of object detection. Often these labeling formats are defined by either: a) a benchmark dataset that is being used (e.g., KITTI), or b) the architectures themselves (e.g., the YOLO labeling convention). Though ideally all networks available to the unified training platform 500 would utilize the same labeling format and would coincide with the DAB's 116 native labeling format (e.g., KITTI), it may be a time consuming and inefficient process to change an architecture to accept varying formats. To do this with all architectures available to the unified training platform 500 may consume an excessive amount of time and resources. Therefore, the data formatting process 220 may be responsible for taking in data in a specific format from the DAB 116 and converting it to the format required by the requested neural network architecture. This may mean, for example, that ground truth label files in KITTI format are reformatted to match a particular network. However, the data formatting process may also support other various tasks such as image file type conversions, file-to-video conversions for inference testing, and CSV conversion for use by a model evaluator. In general, the data formatting process may handle processes that require a file to be modified in order to be utilized by the unified training platform 500 for the task at hand.

The data formatting process 220 may include label format conversion 222, wherein labels from the labels files 206 are converted to the required format for the specific neural network. In addition, image conversion 224 may be performed, wherein images from the images files 208 are converted to different image formats if required. Image resizing 226 may be performed, wherein images from the images files 208 are resized if required. Offline augmentation 228 may be performed if needed. Once the dataset is cleared and properly formatted, it may move on to the Machine Learning 300 phase. In addition, any updates to the labels files 206 and/or the images files 208 may be saved for future use.

Figure 3A:
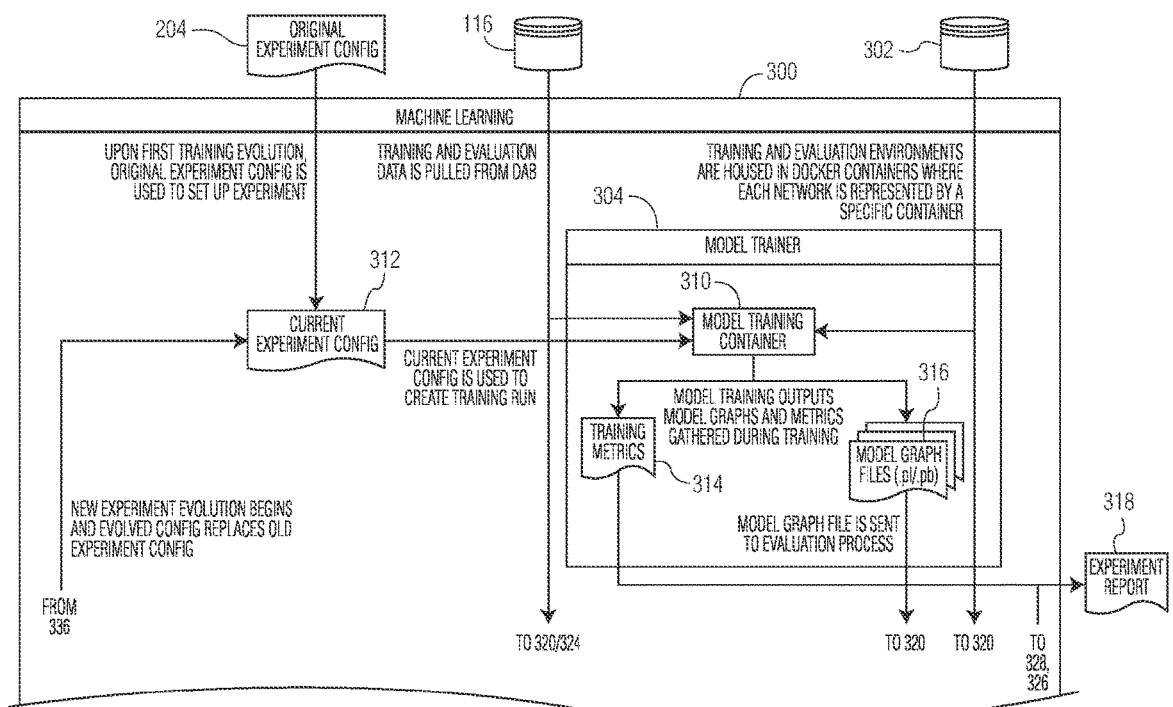
FIGS. 3A-3B are functional diagrams of the Machine Learning portion of the unified training platform, according to an example of the present disclosure.
Figure 3B:
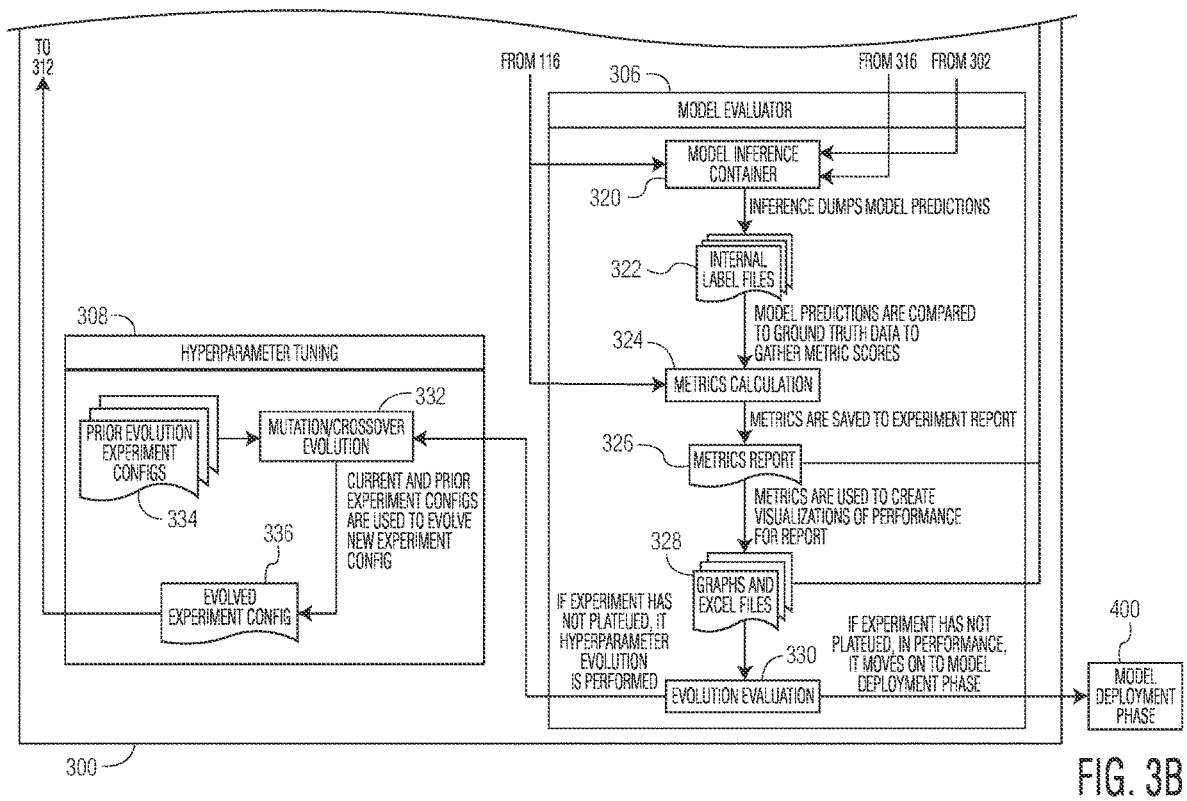

Referring now to FIGS. 3A-3B, functional diagrams of the Machine Learning 300 portion of the unified training platform 500 is shown. The Machine Learning 300 portion of the unified training platform 500 may be focused on selection and training of ML models from one or more repositories 302. The Machine Learning 300 portion may create model files via network training through a host of neural networks available within one or more repositories 302. Network selection and hyperparameters may be selected based on the configuration file 204. The unified training platform 500 may automate all training functions including hyperparameter tuning and model metric tracking. Metrics and monitored values may be reported back during training to advise users on the current state and performance of the experiment. In an example, a full training process may include an initial model obtained from pretrained weights being fine-tuned using the desired dataset, then evaluated and compared to other models of its class. The hyperparameters may then be autotuned and the model may be retrained and evaluated again to see if performance is gained from the hyperparameter tuning. This method may continue until it reaches either a stagnant state, where hyperparameter tuning is no longer a viable method for adjustment, or it reaches a set epoch number, at which point a final evaluation may be performed and reported back to the user.

The Machine Learning 300 portion may include a model trainer 304, model evaluator 306, and hyperparameter tuning 308. The Machine Learning 300 portion may serve as the main model generation section of the unified training platform 500 and/or IVS system 100. More specifically, the Machine Learning 300 portion may be responsible for the actual creation of AI models based on desired inputs of a user. The Machine Learning 300 portion may select and configure the neural networks present in the one or more repositories 302 (e.g., based on experiment requirements), training and evaluating the model, and monitoring performance metrics and speeds as well as machine metrics to ensure there is no lag time in model generation.

The model trainer 304 may handle experiment setup, training, and hyperparameter tuning. The model trainer 304 may be responsible for architecture selection based on user inputs, training initialization, and hyperparameter tuning during the training phase. Due to the dynamic architecture nature of the unified training platform 500, the model trainer 304 may utilize Docker containers for the training processes. The model trainer 304 may select a correct Docker image based on the neural network architecture required and may spin up the Docker container based on that image for the purposes of training. The correct commands may be executed by the network container via the model trainer 304. The model trainer 304 may also handle automated experiment hyperparameter tuning and may adjust experiment hyperparameters to achieve an enhanced performance if requested by the user.

The model trainer 304 may include a model training container 310. The model training container 310 may receive a current configuration file 312, training and evaluation data from the DAB 116, and training and evaluation environments housed in Docker containers (e.g., where each neural network is represented by a specific container) from the one or more repositories 302. During a first training evolution, the current configuration file 312 may be the original configuration file 204. The model training container 310 may execute an analysis of the current experiment performance utilizing an isolated validation dataset contained in the DAB 116 that determines the experiment's current detection abilities in terms of standard object detection metrics (e.g., precision, recall and F1 score). The model training container 310 may generate one or more training metrics 314 and one or more frozen model graph files 316 during the training process. The one or more training metrics 314 may be incorporated into an experiment report 318. The one or more model graph files 316 may be sent to the model evaluator 306.

The model evaluator 306 may handle post model training evaluation and analysis of performance compared to other models. The model evaluator 306 may serve as a metric measure to determine the performance of trained models against one another. The model evaluator 306 may take in completed models from the training phase and may perform an assessment of the models' final performance over several key object detection metrics such as True Positives and Mean Average Precisions. These key metrics may then be compared against other models of a similar make and use case to determine the model's relative performance and internal ranking. The model evaluator 306 may utilize a predetermined performance score for a specific model. The model evaluator 306 may determine a model's improvements over previous evolutions of that model. Additionally, the model evaluator 306 may provide a graphical analysis of the model training performance over time and final results.

The model evaluator 306 may include a model inference container 320. The model inference container 320 may use the one or more model graph files 316, the training and evaluation data from the DAB 116, and the training and evaluation environments housed in docker containers from the one or more repositories 302 to perform inference in order to determine the models current accuracy state. The one or more repositories 302 may be a Docker image repository of architecture code and environments. The model inference container 320 may produce and save files containing the coordinates of the model's predicted detections over the validation set as inferred label files 322. A metrics calculation 324 may be performed by comparing the inferred label files 322 to ground truth data using the training and evaluation data from the DAB 116 to gather metric scores. A metrics report 326 may be generated and added to the experiment report 318. The metrics may be used to create graphs and/or data files 328 that may serve as visualizations of the model performance for reporting.

An evolution evaluation 330 may be performed on the metrics. If it is determined that the experiment has plateaued in performance (i.e., the performance meets a determined threshold), it may be exported to the Model Deployment 400 portion. If it is determined that the experiment has not plateaued in performance, a hyperparameter evolution may be performed by the hyperparameter tuning 308.

The hyperparameter tuning 308 may include a mutation/crossover evolution 332, in which current and prior configuration files 334 (e.g., configuration file 204) are used to generate a new configuration file 336. The hyperparameter tuning may include an evolutionary modification of the configuration files. For example, a random-based value selection within a particular range may be used. A learn rate may be between 0.01 and 0.0001. A random value may be selected in that range, and if improved, the random value may be set to a new limit and a random selection may be made again within the new range. In another example, a grid-based search may be used. The search may be done in a tree-search algorithm in that it attempts to descend down several value paths until it achieves a worse performance than the previous path, at which point it would change direction. A new configuration file may be generated from the prior configuration file with minor controlled variation to specific parameters which may be tracked in order to determine their impact on model performance so that future evolutions to configurations follow a path of improvement to model performance. The new configuration file 336 may then be fed back to the model trainer 304 as the current configuration file 312.

Figure 4:
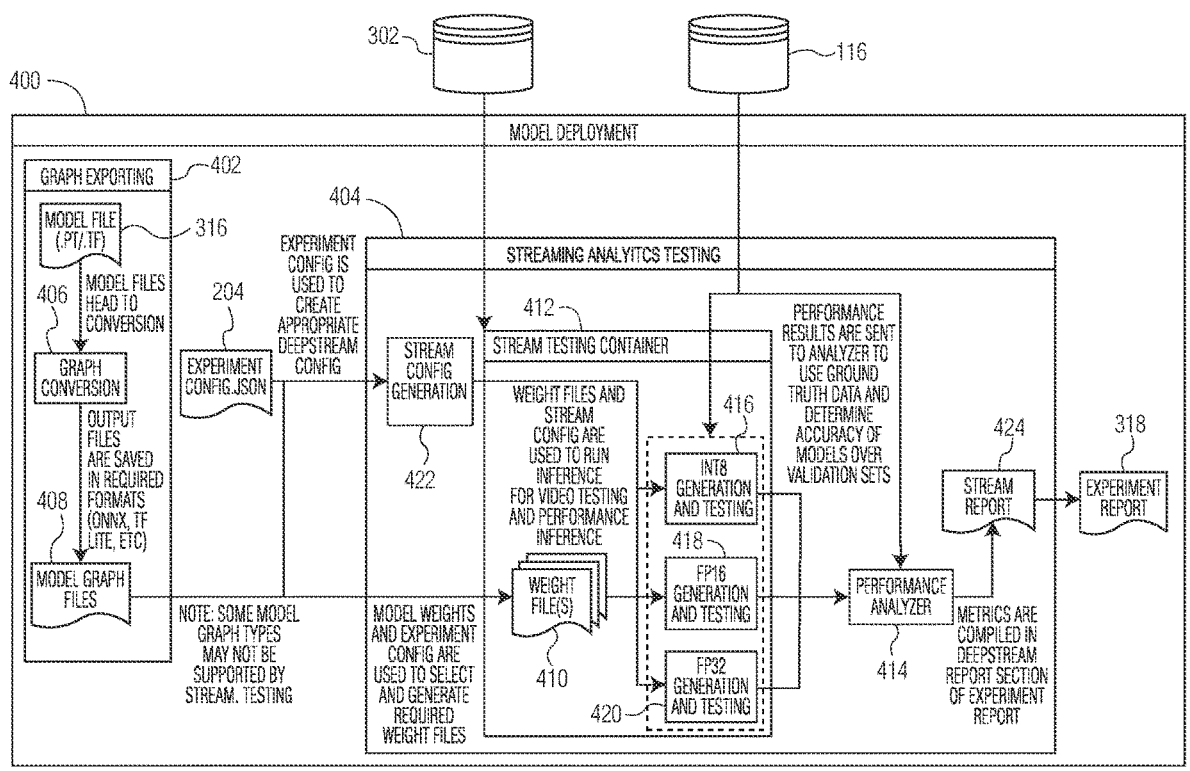
FIG. 4 is a functional diagram of the Model Deployment portion of the unified training platform, according to an example of the present disclosure.

Referring now to FIG. 4, a functional diagram of the Model Deployment 400 portion of the unified training platform 500 is shown. The Model Deployment 400 portion may be focused on taking training models from the Machine Learning 300 portion and converting them into model file formats that can be readily deployed onto one or more production platforms. The Model Deployment 400 portion may include one or more processes: a graph exporting 402 process and a streaming analytics testing 404 process.

The graph exporting 402 process may handle conversion of frozen model graph files 316 generated by the model trainer 304 of the Machine Learning 300 portion into various formats that may be supported by different production platforms. The frozen model graphs 316 obtained from the model trainer 304 may be converted 406 into supported model graph files 408 that may be utilized in streaming platforms for inference. Many production level platforms may not support native frozen graphs (e.g., such as those generated from PyTorch and Tensorflow model training). These model graph files 408 may need to be converted into specific model file types that contain the weight and configuration values of the model that can be used for engine generation and production inference. These final weight files 410 may vary greatly and production level pipelines often require different formats depending on the hardware and software utilized for the streaming. Therefore, the unified training platform 500 may need to support various types of deployable weight files 410. The graph exporting 402 process may determine the deployment platform and may generate the required weight files 410 depending on the unified training platform 500 and the model architecture.

The streaming analytics testing 404 process may handle the final testing of trained models in to ensure the model can be successfully deployed and utilized. In an example, NVIDIA's Deepstream may be used. Deepstream is a streaming platform that may be used for live inference of video feeds. In order to ensure that models created with the unified training platform 500 are prepared properly and can be passed on to production, they may first pass through the streaming analytics testing 404 process. This process ensures that the models created by the unified training platform 500 and the weight files generated by the graph exporting process can be ingested by, for example, Deepstream and perform detections. This process may also provide several metrics and visualizations of model performance during deployment. Once a model has successfully passed the streaming analytics testing 404 process, it may be ready for testing in real world situations.

The streaming analytics testing 404 process may utilize a stream configuration 422, which may be generated using the configuration file 204, a stream testing container 412, and a performance analyzer 414. A separate Docker image that contains code to run streaming analytics with the model graph files that are generated and exported may be used. The Docker image may contain an environment that best matches the current production platform. The streaming analytics testing 404 process may interface with the DAB 116 to pull a current model testing scorecard dataset, which may be a set of images isolated from any training and validation sets that is used exclusively to determine the models performance in a production setting. The stream testing container 412 may use the model graph files (.pt/.tf) to create an inference engine and perform inference on images and labels contained within the model testing scorecard dataset to determine the model's performance. The stream testing container 412 may use the weight files 410 and the stream configuration 422 to run inferences for video testing and/or performance. The stream configuration 422 may not be impacted by the configuration file 204 in any way. The stream configuration 422 may contain, for example, Deepstream configurations that best match the current production deployment in functionality. Properties within the stream configuration 422 may be adjusted to indicate where the model files are located.

In an example, the stream testing container 412 may perform one or more of eight bit integer (INT8) Generation and Testing 416, floating point 16 (FP16) Generation and Testing 418, and floating point 32 (FP32) Generation and Testing 420, each of which may include performing inference over the model testing scorecard dataset pulled from the DAB 116. When the model is generated from the model file it may use several different weight precision values. The higher the precision, the more accurate the model will be, but the more computational cost it will take to run due to have to perform the mathematical calculations on larger numbers. FP32 has 32 digits per weight, FP16 has 16 digits, INT8 (8 bit integer) has 8 binary digits per weight. FP32 may be the most accurate but it also may be the slowest. FP16 may have a lower accuracy, but a higher speed. INT8 may have the lowest accuracy, but the highest speed. The performance analyzer 414 may determine which weight precision value is best to use (which may a balance of speed and accuracy).

The performance analyzer 414 may use ground truth data from the DAB 116 to determine the accuracy of the model as compared to validation sets. In an example, ground truth values from the model testing scorecard dataset from the DAB 116 may be used by the performance analyzer 414 along with the predicted outputs from one or more of the INT8 Generation and Testing 416, the FP16 Generation and Testing 418, and the FP32 Generation and Testing 420 to determine the performance of each of the different precision models. Metrics generated by the performance analyzer 414 may be compiled into a stream report 424, which may be incorporated into the experiment report 318.

Figure 5A:
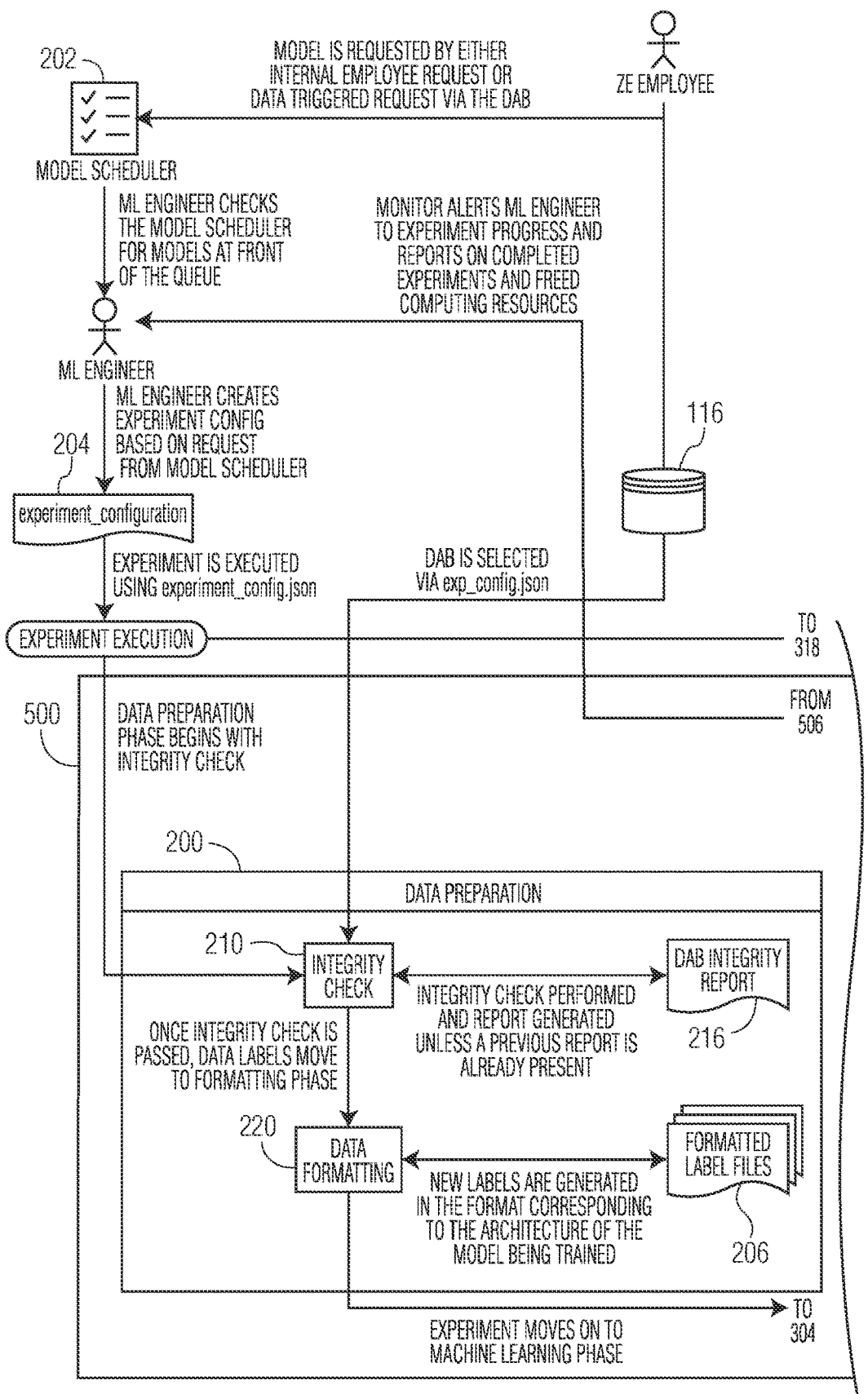
FIGS. 5A-5B are overall functional diagrams of the unified training platform, according to an example of the present disclosure.
Figure 5B:
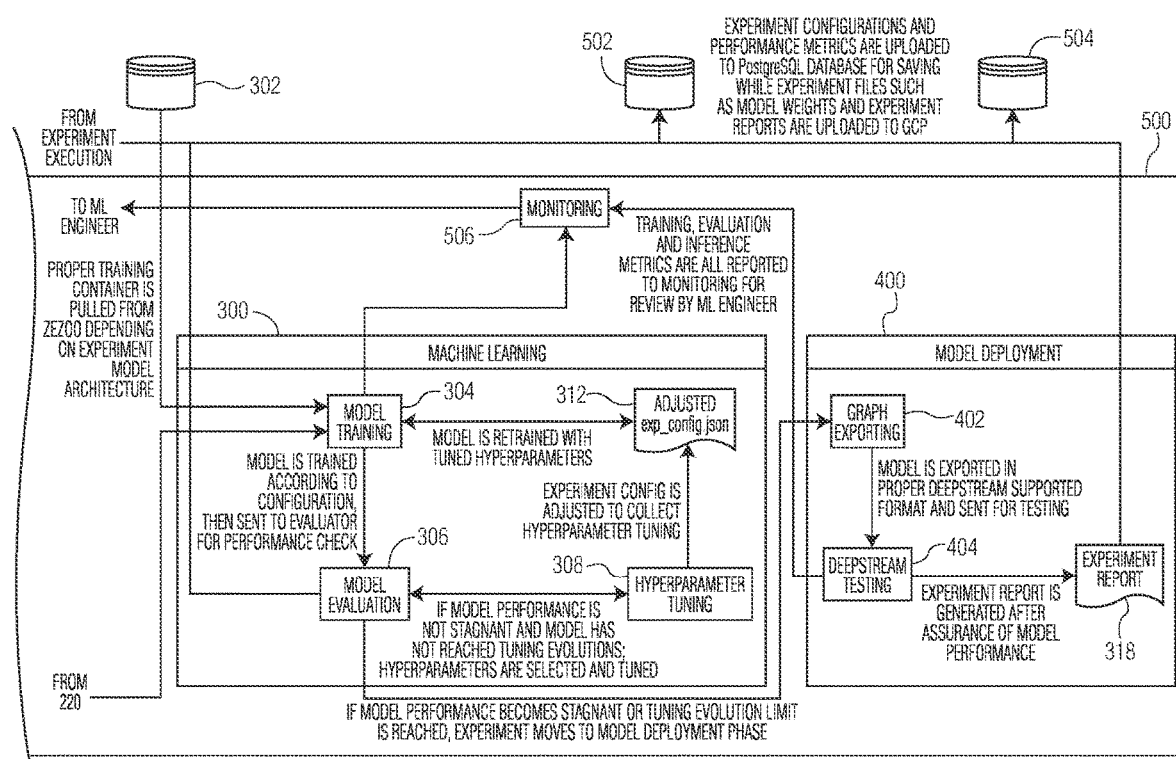

Referring now to FIGS. 5A-5B, overall functional diagrams of the unified training platform 500 illustrating the Data Preparation 200, Machine Learning 300, and Model Deployment 400 portions described above.

The unified training platform 500 may include a monitoring function 506 for both model performance monitoring and machine resource monitoring during training. The monitoring function 506 may be used for monitoring the training of models and the machines that they are training on. The monitoring function 506 may provide metric analysis and training status of experiments being run. Additionally, the monitoring function 506 may handle monitoring of machine hardware and available training resources to ensure that machines are being utilized to the fullest extent without sacrificing model training and performance. The monitoring function 506 may also be responsible for user reports and alerts. Experiment configurations and performance metrics may be uploaded to a structured query language (SQL) database 502. Experiment files such as model weights and experiment reports may be uploaded to storage database 504, which may be cloud-based.

Figure 6:
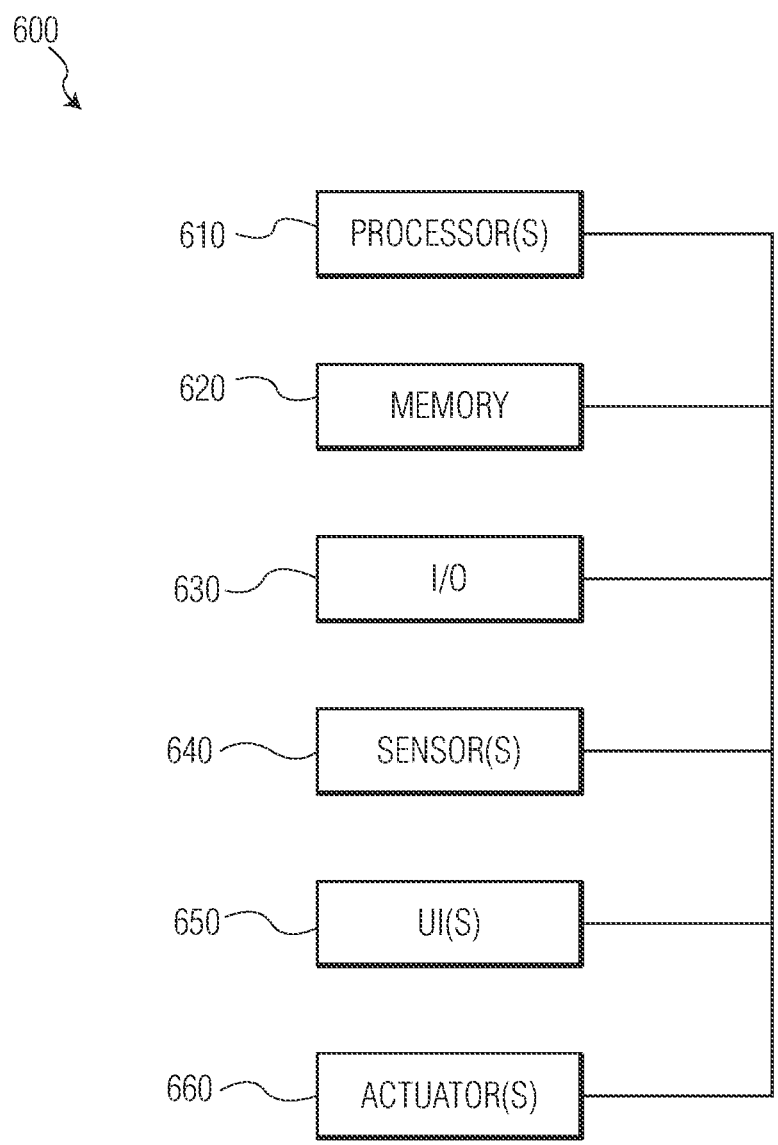
FIG. 6 is an exemplary processing system which can perform the process and/or method shown in any of FIGS. 1-5, according to an example of the present disclosure.

FIG. 6 is an exemplary processing system which can perform the process and/or method shown in any of FIGS. 1-5. Processing system 600 can perform the method of FIGS. 1-5 and/or the structure and/or functionality of the IVS system 100 and/or the unified training platform 500 discussed above. Processing system 600 may include one or more processors 610, memory 620, one or more input/output devices 630, one or more sensors 640, one or more user interfaces 650, and one or more actuators 660. Processing system 600 can be distributed.

Processor(s) 610 may be microprocessors and may include one or more distinct processors, each having one or more cores. Each of the distinct processors may have the same or different structure. Processors 610 may include one or more central processing units (CPUs), one or more graphics processing units (GPUs), circuitry (e.g., application specific integrated circuits (ASICs)), digital signal processors (DSPs), and the like. Processors 21 may be mounted on a common substrate or to different substrates.

Processors 610 may be configured to perform a certain function, method, or operation at least when one of the one or more of the distinct processors may be capable of executing code, stored on memory 620 embodying the function, method, or operation. Processors 610 may be configured to perform any and all functions, methods, and operations disclosed herein.

For example, when the present disclosure states that processing system 600 performs/may perform task "X," such a statement conveys that processing system 600 may be configured to perform task "X." Similarly, when the present disclosure states that a device performs/may perform task "X," such a statement conveys that the processing system 600 of the respective may be configured to perform task "X." Processing system 600 may be configured to perform a function, method, or operation at least when processors 610 may be configured to do the same.

Memory 620 may include volatile memory, non-volatile memory, and any other medium capable of storing data. Each of the volatile memory, non-volatile memory, and any other type of memory may include multiple different memory devices, located at multiple distinct locations and each having a different structure. Examples of memory 620 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that may be used to store program code in the form of instructions or data structures, and the like. Any and all of the methods, functions, and operations described in the present application may be fully embodied in the form of tangible and/or non-transitory machine-readable code saved in memory 620.

Input-output devices 630 may include any component for trafficking data such as ports, antennas (i.e., transceivers), printed conductive paths, and the like. Input-output devices 630 may enable wired communication via USB®, DisplayPort®, HDMI®, Ethernet, and the like. Input-output devices 630 may enable electronic, optical, magnetic, and holographic, communication with suitable memory 620. Input-output devices 430 may enable wireless communication via WiFi®, Bluetooth®, cellular (e.g., LTE®, CDMA®, GSM®, WiMax®, NFC®), GPS, and the like. Input-output devices 630 may include wired and/or wireless communication pathways.

Sensors 640 may capture physical measurements of environment and report the same to processors 610. Examples of sensors 640 include photosensors. User interface 650 may include displays (e.g., LED touchscreens (e.g., OLED touchscreens)), physical buttons, speakers, microphones, keyboards, and the like. Actuators 660 may enable processors 610 to control mechanical forces. For example, actuators may be electronically controllable motors (e.g., motors for panning and/or zooming a video camera).

What is claimed is:

1. A neural network agnostic method for unified data annotation, the method comprising:
    retrieving a dataset from one or more databases based on a configuration file, the dataset comprising image files extracted from one or more video feeds along with corresponding label files comprising information about one or more annotations added to the image files;
    determining that one or more of the image files and one or more of the label files are in a format that is not compatible with a required format of neural network architecture specified in the configuration file,
    reformatting the one or more of the image files and the one or more of the label files, such that the dataset is formatted for the neural network architecture;
    selecting the neural network architecture from a repository based on the configuration file;

training a machine learning (ML) model based on the formatted dataset and one or more hyperparameters;
evaluating a performance of the ML model over one or more object detection metrics;
adjusting the one or more hyperparameters and iterating the training until the performance of the ML model meets a determined threshold; and
once the performance of the ML model meets the determined threshold, converting the ML model to a file format that is compatible with a production platform.

2. The method of claim 1, further comprising:
performing an integrity check on the dataset; and
removing any of image file and label file that fails the integrity check from the dataset.

3. The method of claim 2, wherein the integrity check comprises comparing the image files and the label files to confirm they match.

4. The method of claim 2, wherein the integrity check comprises determining whether any of the image files and the label files are one or more of corrupted, missing, or incorrectly formatted.

5. The method of claim 1, wherein the ML model comprises an initial model obtained from pretrained weights.

6. The method of claim 5, wherein the training the ML model comprises fine tuning the pretrained weights using the formatted dataset.

7. The method of claim 1, wherein the evaluating a performance of the ML model over one or more object detection metrics comprises:
comparing the one or more object detection metrics against metrics of other ML models of to determine a relative performance and internal ranking of the ML model.

8. The method of claim 1, wherein the one or more object detection metrics comprise true positives and mean average precisions.

9. The method of claim 1, wherein the converting the ML model to a file format that is compatible with a production platform comprises:
generating one or more frozen model graphs from the training the ML model;
converting the one or more frozen model graphs to supported model graph files compatible for use in a streaming platform for inference;
generating one or more final weight files from the supported model graph files; and
running one or more inferences over testing images using the one or more final weight files to evaluate an accuracy of the ML model.

10. The method of claim 9, wherein the one or more weights comprise eight bit integer (INT8), floating point 16 (FP16), and floating point 32 (FP32).

11. A system configured to provide a neural network agnostic method for unified data annotation, the system comprising:
a processor operatively coupled to a memory configured to store computer readable code that, when executed by the processor, causes the processor to:
retrieve a dataset from one or more databases based on a configuration file, the dataset comprising image files extracted from one or more video feeds along with corresponding label files comprising information about one or more annotations added to the image files;
determine that one or more of the image files and one or more of the label files are in a format that is not compatible with a required format of neural network architecture specified in the configuration file,
reformat the one or more of the image files and the one or more of the label files, such that the dataset is formatted for the neural network architecture;
select the neural network architecture from a repository based on the configuration file;
train a machine learning (ML) model based on the formatted dataset and one or more hyperparameters;
evaluate a performance of the ML model over one or more object detection metrics;
adjust the one or more hyperparameters and iterating the training until the performance of the ML model meets a determined threshold; and
once the performance of the ML model meets the determined threshold, convert the ML model to a file format that is compatible with a production platform.

12. The system of claim 11, wherein the computer readable code, when executed by the processor, further causes the processor to:
perform an integrity check on the dataset; and
removing any of image file and label file that fails the integrity check from the dataset.

13. The system of claim 12, wherein the integrity check comprises comparing the image files and the label files to confirm they match.

14. The system of claim 12, wherein the integrity check comprises determining whether any of the image files and the label files are one or more of corrupted, missing, or incorrectly formatted.

15. The system of claim 11, wherein the ML model comprises an initial model obtained from pretrained weights.

16. The system of claim 15, wherein the training the ML model comprises fine tuning the pretrained weights using the formatted dataset.

17. The system of claim 11, wherein the evaluating a performance of the ML model over one or more object detection metrics comprises:
comparing the one or more object detection metrics against metrics of other ML models of to determine a relative performance and internal ranking of the ML model.

18. The system of claim 11, wherein the one or more object detection metrics comprise true positives and mean average precisions.

19. The system of claim 11, wherein the converting the ML model to a file format that is compatible with a production platform comprises:
generating one or more frozen model graphs from the training the ML model;
converting the one or more frozen model graphs to supported model graph files compatible for use in a streaming platform for inference;
generating one or more final weight files from the supported model graph files; and
running one or more inferences over testing images using the one or more final weight files to evaluate an accuracy of the ML model.

20. The system of claim 19, wherein the one or more weights comprise eight bit integer (INT8), floating point 16 (FP16), and floating point 32 (FP32).

* * * * *